UNITED STATES PATENT OFFICE.

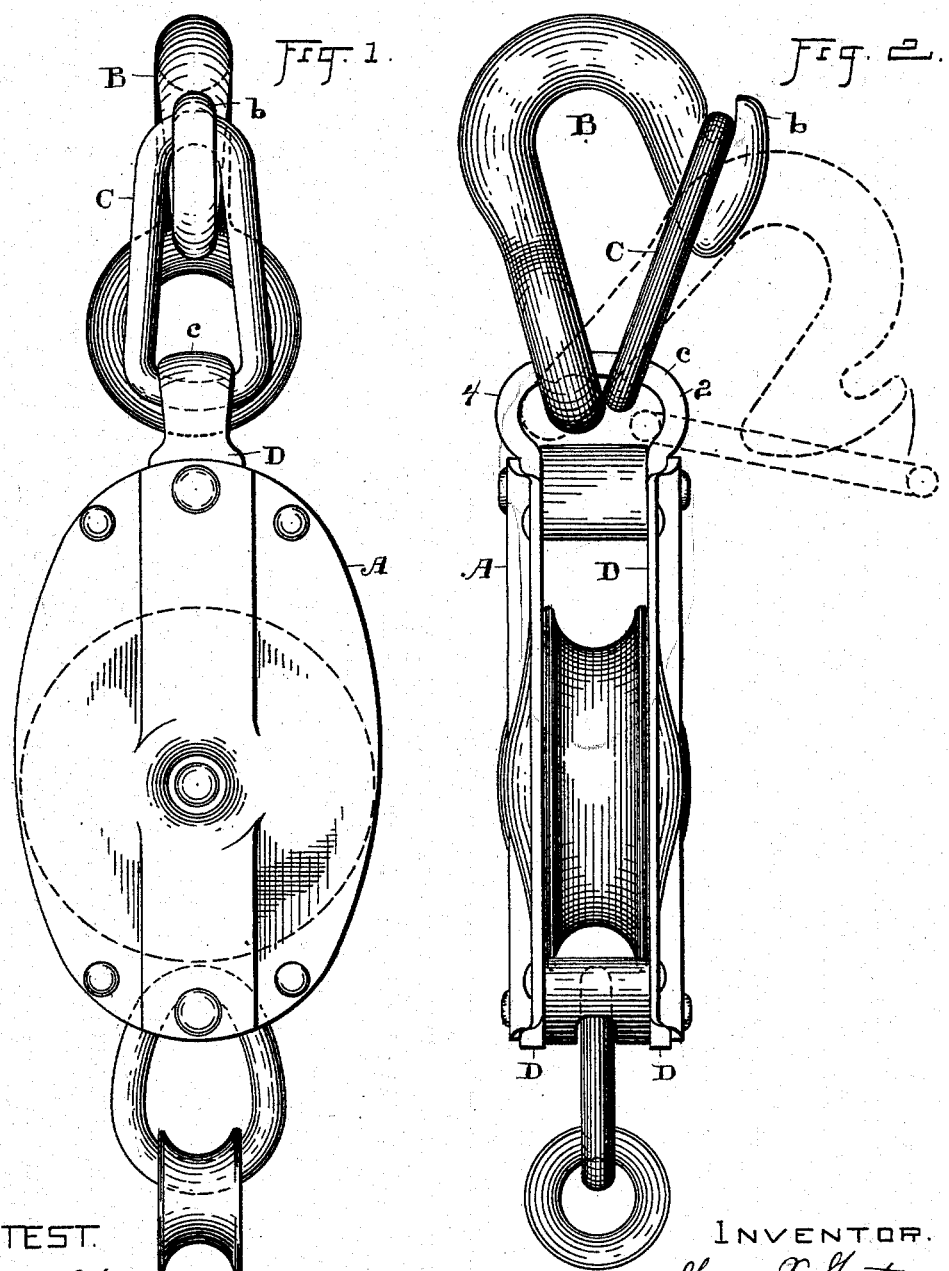

HENRY V. HARTZ, OF CLEVELAND, OHIO.

TACKLE-BLOCK.

SPECIFICATION forming part of Letters Patent No. 527,490, dated October 16, 1894.

Application filed August 20, 1894. Serial No. 520,770. (No model.)

*To all whom it may concern:*

Be it known that I, HENRY V. HARTZ, a citizen of the United States, residing at Cleveland, in the county of Cuyahoga and State of Ohio, have invented certain new and useful Improvements in Tackle-Blocks; and I do hereby declare that the following is a full, clear, and exact description of the invention, which will enable others skilled in the art to which it appertains to make and use the same.

My invention has reference to tackle blocks, and the object of the invention is to provide a tackle block with simple and effective means for positively preventing accidental or other disengagement of the hook when the block is in use, and which will operate to vastly increase the strength and serviceability of the hook in times of excessive or extraordinary strain.

To these ends the invention consists in a tackle block and hook and a locking and strengthening link adapted to engage over the point of the hook, all substantially as shown and described and particularly pointed out in the claims.

In the accompanying drawings, Figure 1 is a side elevation of a tackle block having my improvement embodied therein, and showing the locking and strengthening link as it appears when in engagement with the hook and in use. Fig. 2 is an edge view of the tackle block and a side view of the hook, and showing the link in full lines as it appears in Fig. 1, and the hook in dotted lines in the position to which it is brought to disengage the link.

A represents the block proper, which may be of the present or any other form or construction, the style or kind of block in itself being immaterial.

B is the hook, which likewise is the same in construction and function as is now commonly known except at its point, which has an upturned or upwardly projecting spur or point —b— which forms a reverse hook on the point itself of the main hook.

C is the hook locking and strengthening link. This link is engaged upon the shank or clevis —c— of the block strap D at the front of the hook B and has such length as to hook over or behind the point or projection —b— and come into action and help to take the pull and strain on the hook B the moment that the slightest spreading tendency of the hook occurs. In other words, the link is practically or substantially ready, when in position as seen in Fig. 1 and in full lines Fig. 2, to divide the pull on the hook B. Therefore, it may be said to be up against the shank —c— and down in the recess of reverse hook —b— when the parts are as seen in the drawings. Obviously, therefore, the hook B is thus provided with an effectual bar and lock for a ring or anything of the like which may be engaged thereon, and no disengagement therewith can by any possibility occur until the parts are brought to a position and relation with the block which they cannot assume in use and in which both parts have really to be separately handled and brought to positions they cannot attain alone. The disengaging position is shown in Fig. 2 in dotted lines. Here we see that the disengaging point for the link is practically at right angles to the block, and further that the link must come into the outward swell —2— of the shank —c— at one side thereof, while the hook B is moved over against the opposite side or swell —4— in order that they may be separated. If the swells —2— and —4— were not present the parts might not be separated, but there would have to be reduction in the depth of hook —b—, and a careful adjustment of parts in relation to each other. This construction and arrangement of parts render it impossible to disengage or release the locking link when the hook is in a suspensory or working position, and render the work as truly secure against release of the engaged member, whatever it may be, as if it were itself a closed link.

In the foregoing construction it must be understood that the hook B has no such freedom of play in its eye and within the shank or clevis —c— of the block A as to allow it to be moved inward in any line whatever other than about that shown in dotted lines Fig. 2.

The desirability of an effectual lock for the hook is well-known to all manufacturers and users of tackle blocks, but the locking link is no less serviceable and valuable in its capacity as a reinforcing member for the hook. The increased strength to the hook obtained by this link is fully two hundred per cent., so that a hook which will sustain, say, five tons weight alone will with the link easily sustain fifteen tons. Indeed, the block itself will be torn or broken before the hook and link will yield, and thus I get rid of the very great annoyance and danger which breaking hooks always entail.

Obviously, a hook shaped link might be used instead of the link C here shown, and serve well the purpose of locking the hook B, but not so well the purpose of strengthening it. However, the hook form of link will serve a fair purpose and is understood to be included in this invention and to be covered by the claims.

Having thus described my invention, what I claim as new, and desire to secure by Letters Patent, is—

1. A tackle block and a hook therein constructed with a reverse hook at its point and a link to engage over said reverse hook, substantially as set forth.

2. A tackle block and a hook and a link secured side by side in the block, the said hook having its point constructed to engage and hold the said link, substantially as set forth.

3. The block and the shank or clevis thereon widened at its sides and a hook having a reverse hook on its point secured on said shank, and a link on said shank in front of the hook thereon and arranged to engage over said reverse hook, substantially as set forth.

Witness my hand to the foregoing specification.

HENRY V. HARTZ.

Witnesses:
H. T. FISHER,
GEORGIA SCHAEFFER.